United States Patent
Childress et al.

(10) Patent No.: US 11,068,566 B2
(45) Date of Patent: Jul. 20, 2021

(54) TEMPORAL ACCESS AUTHORIZATION AND NOTIFICATION

(71) Applicant: International Business Machines Corporation, Armonk, NY (US)

(72) Inventors: Rhonda L. Childress, Austin, TX (US); Michael Bender, Rye Brook, NY (US); Todd R Palmer, Danbury, CT (US); Manjari Roy, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 16/446,097

(22) Filed: Jun. 19, 2019

(65) Prior Publication Data

US 2020/0401677 A1 Dec. 24, 2020

(51) Int. Cl.
  *G06F 21/12* (2013.01)
  *G06F 21/32* (2013.01)
  *H04L 9/06* (2006.01)
  *G06F 21/44* (2013.01)

(52) U.S. Cl.
  CPC ............ *G06F 21/121* (2013.01); *G06F 21/32* (2013.01); *G06F 21/44* (2013.01); *H04L 9/0643* (2013.01); *G06F 2221/2137* (2013.01); *H04L 2209/38* (2013.01)

(58) Field of Classification Search
  CPC ........ G06F 21/121; G06F 21/32; G06F 21/44; G06F 2221/2137; H04L 9/0643; H04L 2209/38
  See application file for complete search history.

(56) References Cited

U.S. PATENT DOCUMENTS

| | | | |
|---|---|---|---|
| 5,530,905 | A | 6/1996 | Nichols |
| 6,055,637 | A | 4/2000 | Hudson |
| 7,900,253 | B2 | 3/2011 | Wendling |
| 8,005,965 | B2 | 8/2011 | Williams |

(Continued)

OTHER PUBLICATIONS

Simpson et al., "Assured Identity for Enterprise Level Security", Institute for Defense Analysis, Lecture Notes in Engineering and Computer Science, in Proceedings of the World Congress on Engineering, Jul. 11, 2017, 10 pps.

*Primary Examiner* — Malcolm Cribbs
*Assistant Examiner* — Stephanie S Ham
(74) *Attorney, Agent, or Firm* — David Mattheis; Maeve M. Carpenter

(57) ABSTRACT

A computer-implemented method validates information indicating ownership of an asset by a first user. Information of parties of interest regarding use of the asset are received. The information associated respectively with the asset, the ownership, and the parties of interest are stored in a transaction repository structure. The identity information of a second user selected by the first user to receive temporal authorization of use of the asset is validated. Responsive to validating of the second user's identity a temporal authorization transaction of the use of the asset by the second user is generated. Responsive to confirming the parties of interest regarding the use of the asset, a notification of the temporal authorization transaction is sent to the parties of interest, and the information associated with the transaction of the temporal authorization of use of the asset by the second user is stored in a transaction repository structure.

17 Claims, 4 Drawing Sheets

(56) References Cited

U.S. PATENT DOCUMENTS

| | | | |
|---|---|---|---|
| 8,880,239 B2 * | 11/2014 | Kleve | G06Q 30/0645 |
| | | | 701/2 |
| 8,904,187 B2 | 12/2014 | Saito | |
| 9,769,141 B2 | 9/2017 | Brannon | |
| 10,158,632 B2 | 12/2018 | Hanifen | |
| 2003/0163686 A1 | 8/2003 | Ward | |
| 2017/0301048 A1 * | 10/2017 | Turek | G06Q 10/10 |
| 2017/0301052 A1 | 10/2017 | Abt, Jr. | |
| 2017/0330174 A1 * | 11/2017 | Demarinis | G06F 21/62 |
| 2018/0205725 A1 * | 7/2018 | Cronkright | H04L 63/0838 |

* cited by examiner

TEMPORAL ACCESS AUTHORIZATION AND NOTIFICATION

FIELD OF THE INVENTION

The present invention relates generally to the field of access authorization, and more particularly to temporal access authorization of a device, and notification to parties of interest.

BACKGROUND OF THE INVENTION

Loaning or sharing of an item or granting use or access to another user is often done in an informal manner. When a person wants to allow an individual to use an item that they own, authorization is often given verbally and implied to be temporary. Duration-based authorization requires manual tracking or an automated method to determine a start and end point of access, use, ownership, or possession of an item or asset. Terms such as "item", "object", or "asset" may be used as a general term of the subject of temporal authorization, and hereafter, are collectively referred to by the term "asset". Assets may include such things as vehicles or smart devices, or may refer to financial implements or accounts, such as credit cards, access to ATM accounts, or other financial services.

SUMMARY

Embodiments of the present invention disclose a method, computer program product, and system. The method provides for a computer-implemented method in which a computer processor validates information indicating ownership of an asset by a first user. The computer processor receives information of parties of interest regarding use of the asset. The computer processor stores the asset information, the ownership information, and the parties of interest information associated with the asset in a transaction repository structure. The computer process validates information identifying a second user, selected by the first user to receive temporal authorization of use of the asset. Responsive to confirming the validation of the information identifying the second user, generating, by a computer processor, a temporal authorization of use of the asset by the second user. Responsive to confirming the parties of interest regarding the use of the asset, sending, by a computer processor, a notification of the temporal authorization of the use of the asset by the second user to the parties of interest, and storing, by a computer processor, information associated with transaction of the temporal authorization of use of the asset by the second user in a transaction repository structure.

DETAILED DESCRIPTION

Figure 1:
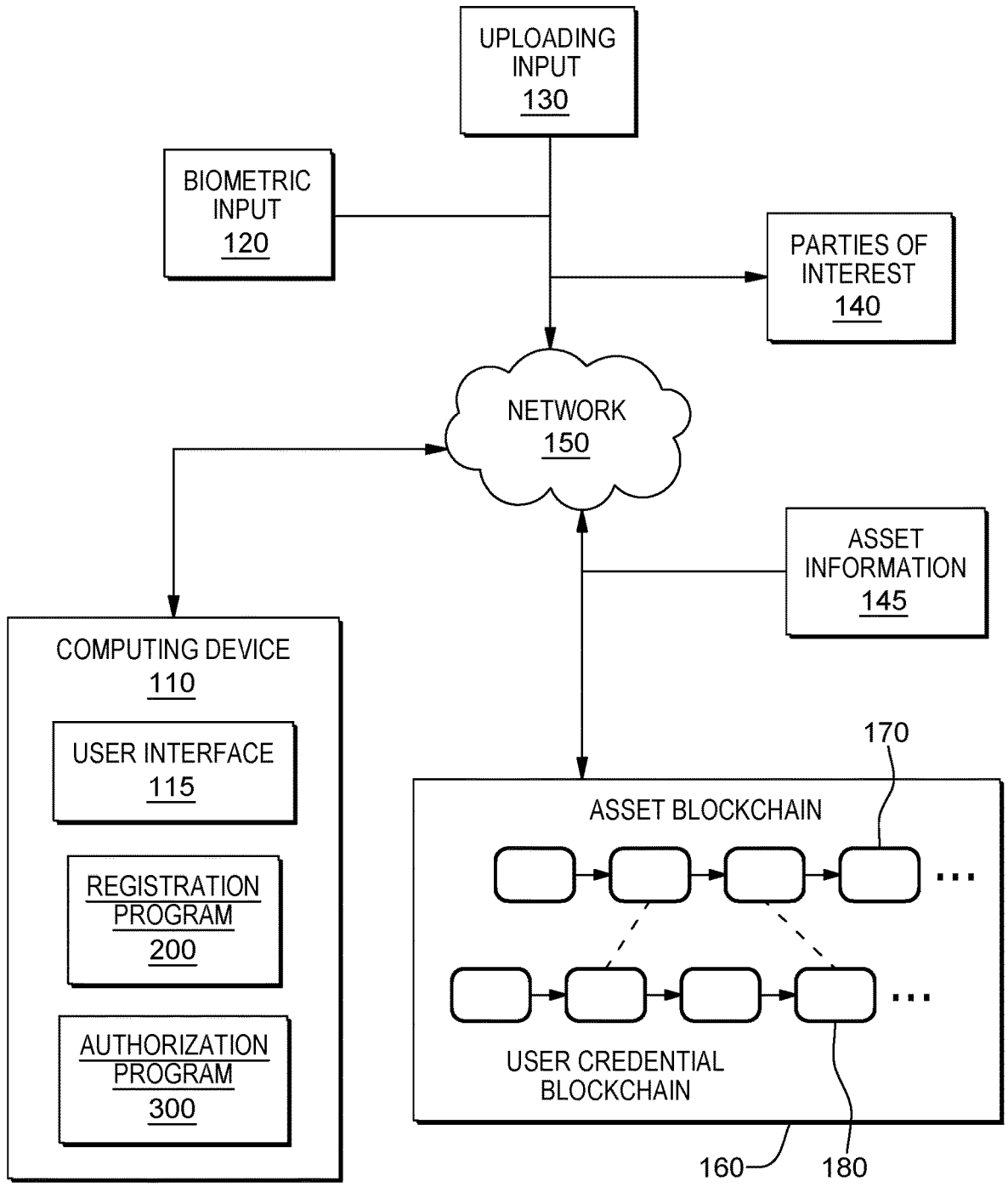
FIG. 1 is a functional block diagram illustrating a distributed data processing environment, in accordance with an embodiment of the present invention.

Embodiments of the present invention recognize that a user as owner of an asset has few options to formally designate temporary access or authorization of possession, access, ownership, or use of the asset by a second authorized user. The lack of formal and reliable proof of temporary authorization can in some cases lead to compromising situation trying to distinguish authorized temporary possession, access, ownership or use, from unauthorized use or theft. Embodiments of the present invention further recognize that there is no formal and secure audit trail easily associated with the temporary or permanent authorization to access, use, own, or possess the asset, nor is there formal activity to communicate information associated with the temporary authorization to parties of interest or other related user devices.

Embodiments of the present invention disclose a method, computer program product, and system for formal temporal authorization of possessive and operational access to an asset of a second user, by a first user owning the asset. In some embodiments, information regarding ownership of an asset is established and stored in a first repository data structure, including credentials and information of the asset, as well as information and data supporting ownership of the asset by the owner. Information regarding other users to which the asset may be authorized is assembled, including biometric and other credentials of the respective user, and the information is input to a second repository data structure used to validate identity and select users to receive temporal authorization to access, use, own, or possess an asset. In some embodiments to track the authorization that has been granted to an individual to temporarily access, use, own, or be in possession of the asset, a transaction is added to the first repository data structure and includes connection or links to stored information of the asset, ownership, and second user, as well as details and conditions of the temporal authorization transaction. In some embodiments, blockchain data structure techniques are used to store the transaction information of the temporal authorization as well as credential information of the asset, ownership, and users receiving temporal authorization. In a preferred embodiment, use of blockchain techniques offer a more secure source of validation.

Embodiments of the present invention allow for a control point to enter information about an asset (e.g. serial number, vehicle identification number (VIN), etc.) and enter information and credentials of the asset owner. In some embodiments, biometric information of the owner is stored, along with unique identification of the owned asset. Contact information of parties of interest associated with the asset (e.g. insurance company, rental car company, frequent contact device users) is associated with the owned asset and stored along with additional asset and party of interest information. In some embodiments, additional actions or approvals by third parties (identified as parties of interest) may be required to complete the owner's grant of temporary authorization. In some embodiments, parties of interest include contacts (individuals and businesses or organizations) that have one or a combination of an awareness interest, a financial interest, a legal interest, an approval interest, an informational interest, or provide service as an interest associated with the asset. In some embodiments, temporary authorization may be a short period of time, measured in hours or days, or may be a longer period of time measured in weeks, months, or years, and in other embodiments, temporal authorization may be indefinite; effectively granting ownership sharing or transfer. Accordingly, some embodiments of the present invention are not limited by the duration of the temporary authorization, which may be a permanent authorization of possession, access, or use, such as authorization of a change of ownership.

A user interface enables a user (first user) to establish documented identification and ownership of an asset, documented credentials of a potential temporary authorized user (second user) identification of parties of interest associated with the owned asset, and enables the user (first user) to designate and grant authorization of another user (second user) having documented credentials, to possess, access, and/or use the owned asset. In some embodiments of the present invention granting temporary authorization includes configuring Internet-of-Things (IoT) devices to operate in response to recognition of a credential (e.g., biometric) of a user granted temporary authorization of the device (e.g. car recognizing authorized driver), and in other embodiments, authorization requires party of interest approval to be given to complete authorization.

Embodiments of the present invention provide temporal authorization of access to a physical asset, a service, or an account; entry to a building, room, or container; or possession of a physical asset, in which secure, verifiable credentials of asset ownership and the temporal authorization are documented, such as by the use of blockchain structures. In some embodiments of the present invention, a blockchain structure includes a time-stamped series of immutable records of data that are managed by a cluster of computers not owned by a single entity accessing and using the blockchain structure. In some embodiments, one blockchain structure is employed to identify an asset, assign ownership to the asset, and record a transaction of temporal authorization of a user to access, use, own, or possess the asset. The sharing of the asset as defined in details included in the temporal authorization transaction of the asset blockchain, enables functionality of the asset by the verified individual, (e.g. a car wouldn't start if the person using the car was not authorized via verifiable credentials (i.e., biometrics) to start the car based on stored credentials in the blockchain structure). A separate second blockchain structure is employed that includes verifiable identity and credential information about individuals, and in some embodiments, includes biometric data associated with the identity of the individual. It is acknowledged that the association of asset, ownership, and temporal authorization transaction in one blockchain structure, with user identification credential information in a separate blockchain structure, is but one possible arrangement of secure and accessible data storage, and persons having ordinary skill in the art recognize that other combinations and arrangements are possible without detracting from the inventive concepts presented herein.

Embodiments of the present invention, herein, may refer to the use of blockchain technology providing secure and immutable record history, and biometric credentials as a source of validation of a non-owning user of an asset. However, embodiments further acknowledge that a person having ordinary skill in the art (PHOSITA) recognizes that other methods of providing secure record history of ownership and validated user identity remain consistent with the concepts discussed herein.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, biometric input 120, uploading input 130, parties of interest 140, asset information 145, data records 160, asset blockchain 170, and user credential blockchain 180, all connected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between biometric input 120, uploading input 130, parties of interest 140, asset information 145, data records 160, and computing device 110, in accordance with embodiments of the present invention.

Biometric input 120 is a source of authenticating credentials. In some embodiments of the present invention, biometric input 120 includes biometric data of users and, in some cases, biometric data of assets (e.g., pets). The biometric data of users includes data validating the identity of asset owners, data validating the identity of users receiving temporal authorization of access and/or use of the asset, and in some cases, data identifying the asset. In some embodiments, biometric input 120 includes various biometric data types, including but not limited to facial recognition, finger print, retina print, voice print, foot (paw) print, nose print, embedded chip signal, and dental records. In some embodiments, biometric input 120 is a repository of secure, validated, and digitized biometric data accessed as input to registration program 200 via user interface 115 of computing device 110. In other embodiments, biometric input 120 represents real-time input of biometric data of a corresponding asset owner, temporal authorization recipient, or asset.

Embodiments of the present invention limit the collection and use of user data authorized by the respective user. The user authorization may be by option selection, and the authorization is included in the temporal authorization transaction data. In some embodiments the approving user may select or limit the types of data collected and used for authentication. In some embodiments, the collected data is discarded after the temporal authorization period expires. In some embodiments the parties of interest 140 determine a type of data to obtain to authenticate a user or asset identity. Embodiments of the present invention do not collect or store personalized data, including biometric data or other user specific data, when there is an expectation of data privacy.

Uploading input 130 is a source of uploaded credential data authenticating assets, owners of assets, and users receiving temporal authorization of one or a combination of: access, use, ownership, and possession of an asset. In some embodiments, uploading of credential data includes scanning of an existing physical document or file, and transmitting the resulting digitized file to a repository of credential information. In some embodiments, the resulting digitized file is transmitted and stored in a repository of uploading input 130. In other embodiments, the resulting digitized file is received by registration program 200 operating on computing device 110 via UI 115. The content received from uploading input 130 includes but is not limited to one or combinations of text, image, video, and audio content. For example, content received from uploading input 130 may include receipt of purchase, lease, rent, donation, or gift of an asset; photographs of an asset, photographs of a user, passport, birth certificate, location verification documents, titles, policies, as well as other content.

Parties of interest 140 is a source of contact and identification information of a set of users or organizations having vested interest in the temporal authorization of access, use, ownership, or possession (or any combination thereof) of an asset by a non-owning user. In some embodiments, parties of interest 140 has financial interest in regard to the authorization of access, use, or possession of the asset. In other embodiments, parties of interest 140 provides a consenting approval of the temporal authorization of access, use, ownership or possession of the asset by a non-owner user. In yet other embodiments, parties of interest 140 is authorized to modify contracts, agreements, or policies based on the temporal authorization associated with an asset granted to a non-owning user. In yet other embodiments, parties of interest 140 includes providing awareness of the temporal authorization to contacts of individuals, businesses, or organizations that have association with the asset. Examples of parties of interest may be, but are not limited to building management, banks, insurance companies, security groups, and law enforcement.

Asset information 145 represents one or more assets having verifiable ownership by an owning user and verifiable identity of the particular asset. In some embodiments of the present invention, asset information 145 is information identifying and describing a physical object, such as a vehicle, a smart device, an Internet of Things (IoT) enabled device, or jewelry. In other embodiments, asset information 145 includes information enabling access or use of financial resources, such as a credit card, debit card, or accounts. In yet other embodiments, asset information 145 includes information for access to function, membership, or subscription accounts, such as but not limited to email, short messaging service (SMS), web-based purchasing accounts, subscription to online resources.

Embodiments of the present invention validate ownership of an asset by analyzing asset information 145 with respect to a designated owner (or owners) and enables the temporal authorization of access, use, ownership and possession of the asset identified and described by asset information 145 by a user (or users) designated by the validated owner. In reference to the "access", "use", "ownership" or "possession" of an asset, a person having ordinary skill in the art recognizes that one or a combination of the terms may apply to granting of asset authorization, and embodiments of the present invention are not limited by referencing one or a combination of terms regarding granting of temporal authorization of an asset.

Data records 160 is a record repository that stores asset ownership information and user credential information associated with temporal authorization for access, use, or possession of an asset by a non-owner of the asset. In some embodiments, the asset information, owner and ownership information, and user credential information are loaded, stored, and maintained in data records 160. In some embodiments of the present invention, the asset, owner, ownership, and user credential information are added to data records 160 via user interface 115 of computing device 110 operating registration program 200. Data records 160 is depicted as including record transaction structures asset blockchain 170 and user credential blockchain 180.

Asset blockchain 170 is a record transaction storage structure that includes information validating the identity of asset information 145 and ownership of asset information 145 by an owning user. In some embodiments of the present invention, a blockchain structure is used to include pertinent information from multiple sources in one shared, tamper-evident ledger in which the entered transactions cannot be altered. In some embodiments of the present invention, asset blockchain 170 is a transaction recording data structure establishing the ownership of an asset to an owning user. Asset blockchain 170 includes input of scanned and uploaded evidence supporting and validating the ownership of an asset by an owning user. In some embodiments the evidence is received from uploading input 130 and biometric input 120, in other embodiments, the evidence may be manually scanned or input via user interface 115 of computing device 110 operating registration program 200.

A blockchain solution is a distributed ledger technology of a shared network-based database that is visible to multiple participants and observers of the blockchain and includes consensus receipt by all authorizing parties before the transaction is included in the network blockchain structure. In some embodiments of the present invention, information associated with ownership of an asset includes identifying one or more parties of interest with respect to the asset, such as parties of interest 140. Asset blockchain 170 includes information associated with parties of interest 140 with respect to asset information 145 and the identified owning user (or users) and stores the information in a block connected to a previous block and a subsequent block in the structure of asset blockchain 170. In some embodiments, asset and ownership information includes scanning documents of ownership, receipts, titles, photos, videos, audio recordings, or other content applied to the validation of ownership of an asset, such as asset information 145.

In some embodiments of the present invention, asset blockchain 170 includes the validated temporal authorization of an asset to a designated user that does not own the asset as a transaction of authorization program 300, operating on computing device 110. In some embodiments, asset blockchain 170 stores information associated with the temporal authorization transaction of access, use, ownership, or possession of the asset identified by asset information 145, in a tamper-evident block. The stored information includes credential information that may be linked-to from other blockchains, of the user receiving temporal authorization, asset owner credentials granting temporal authorization of the asset to the user, information identifying the asset, and party of interest information associated with the asset.

Embodiments of the present invention recognized that a person having ordinary skill in the art (PHOSITA) understands that use of a blockchain structure to store information associated with a temporal authorization is preferred but represents one possible implementation of an embodiment of the invention. Other transaction recording techniques and technologies may be included in implementations without limiting or deviating from the concepts included herein.

User credential blockchain 180 is a record transaction storage structure that includes credential information validating the identity of users associated with the ownership of the asset identified by asset information 145, parties of interest of the asset, or a user receiving temporal authorization of access, use, ownership, or possession of the asset. In some embodiments of the present invention, a blockchain structure is used to include pertinent credentials to validate user and identity of parties of interest 140. User credential blockchain 180 enables authorization program 300 to identify a user, validated by credentials, as an owner of an asset, such as the asset identified by asset information 145, or a recipient of a temporal authorization of an asset.

In other embodiments, user credential blockchain 180 associates a party of interest, such as parties of interest 140, to an asset. The association between the party of interest and the asset may include providing notification of temporal authorization for access, use, or possession of the asset by a non-owning user or may require consent by the party of interest to complete the transaction of granting temporal authorization of a user to an asset. In some embodiments, user credential blockchain 180 receives biometric credentials of users from biometric input 120, associating the biometric credential to a particular user. In some embodiments, the received biometric credentials are used to validate the identity of the user and confirm the identity as an asset owner or as a recipient being granted temporal asset authorization.

In some embodiments of the present invention, user identification is validated by use of biometric data of the respective user. An owning user's identification biometrics are associated with a corresponding asset and included in an information block added to asset blockchain 170. In some embodiments, the biometric data of an asset-owning user and users potentially granted access, use, ownership, or possession of the asset, are obtained by biometric input 120 and received by registration program 200 operated by computing device 110. Biometric data for users may include, but are not limited to, facial recognition data, finger print data, retina scan data, audible voice data, and image data. In some embodiments, biometric data includes paw prints, nose prints, or other biometric identifier of pet or animal assets. In yet other embodiments, user identification is validated with photographic or video imaging in combination with text-based documentation, such as a license, passport or other validated credential.

Computing device 110 includes user interface 115, registration program 200, and authorization program 300. Computing device 110 can be a standalone computing device, a management server, a web server, a mobile computing device, or any other electronic device or computing system capable of receiving, sending, and processing data. In other embodiments, computing device 110 can represent a server computing system utilizing multiple computers as a server system, such as in a cloud computing environment. In another embodiment, computing device 110 can be a laptop computer, a tablet computer, a netbook computer, a personal computer (PC), a desktop computer, a personal digital assistant (PDA), a smart phone, or any other programmable electronic device capable of communicating with input sources biometric input 120, uploading input 130, data records 160 and in some embodiments, asset information 145, and other computing devices (not shown) within distributed data processing environment 100 via network 150. In another embodiment, computing device 110 represents a computing system utilizing clustered computers and components (e.g., database server computers, application server computers, etc.) that act as a single pool of seamless resources when accessed within distributed data processing environment 100. Computing device 110 may include internal and external hardware components, as depicted and described in FIG. 4.

User interface 115 provides users of computing device 110 an interface to recognition program 200 and authorization program 300. Additionally, user interface 115 provides a source for manual input of ownership credentials, asset information, and user credentials by registration program 200 and authorization program 300. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to computing device 110. User interface 115 enables a user of computing device 110 to manually input or select one or more credentials validating the identity of an asset, an identity of asset owner, or identities of users potentially receiving temporal asset authorization. In some embodiments, input is automatically received from biometric input 120, uploading input 130, and parties of interest 140, via a communications port of computing device 110.

Registration program 200 is an application operating on a computing device, such as computing device 110, connected to network 150 of distributed data processing environment 100. Registration program 200 receives information identifying an asset and validates ownership of the asset by connecting the credentials associated with the asset to credentials associated with the owner. In some embodiments, registration program 200 receives photo images, receipts, title documents, certificate of ownership or other documents identifying an asset. In some embodiments the asset documents indicate a particular user as the owner of the asset. For example, a receipt for the purchase of an asset may include the name, address and partial credit card number of the purchaser as asset information 145 that are uploaded to registration program 200 operating on computing device 110, from uploading input 130 via network 150.

Registration program 200 also receives credential information associated with the identity of a user including users owning an asset, and users that may be granted temporal authorization to access, use, and possess an asset owned by another user. For a user presenting credential information as owning an asset, identifying documents, such as a passport or a driver license that includes the name, address, photograph, date of birth, and other credential information of the user are uploaded from uploading input 130 to registration program 200 operating on computing device 110 via network 150. In some embodiments of the present invention, the user credential information is scanned and transmitted real-time to registration program 200. In other embodiments, the information is submitted and stored in uploading input 130 and retrieved by registration program 200 as needed for performing a temporal authorization of a non-owning user to access, use, or possess an asset.

In some embodiments of the present invention, biometric data associated with respective users is received by registration program 200 from biometric input 120 via network 150. The biometric data may include, for example, facial recognition data, finger print data, retina scan data, or audio voice print data. The biometric data may be a real-time transmission from biometric input 120 or may be previously recorded along with submission of other sources of identity verification from the user owning the asset and users that may be granted temporal asset authorization. The biometric data is associated with the additional credential information of the respective user received from uploading input 130. For users owning an asset, the biometric data, document identification data, and other credentials of the owning user are connected to the credential information of the asset and the connected (linked) information is stored in a retention repository, such as storing the information as one or more connected blocks included in asset blockchain 170. Similarly, registration program 200 connects biometric data of respective users with other sources of identity credentials of the respective users and stores the credential information of the users in a retention repository, such as storing the credential information of respective users in user credential blockchain 180.

Authorization program 300 is an application operating on a computing device, such as computing device 110, connected to network 150 of distributed data processing environment 100. Authorization program 300 enables a first user that owns an asset to provide a temporal authorization to a second user for one or a combination of access, use, and possession of the asset. Authorization program 300 validates the identity of the asset, the identity of the first user owning the asset, and the identity of a user to which temporal asset authorization is to be granted. Authorization program 300 receives a selection of a second user identity to be granted temporal authorization for one or a combination of access, use, or possession of the asset. Authorization program 300 connects the credential information of the asset and the credential information of the first user owning the asset in asset blockchain 170 to the credential information of the second user granted temporal asset authorization in user credential blockchain 180.

In one exemplary embodiment, a first user has identification credential information included in a block of user credential blockchain 180. The identification credentials include scanned documents from uploading input 130 and biometrics data from biometric input 120. The first user owns an asset identified by photographs and receipt document credentials included in a block of asset blockchain 170. The first user credential information as an asset owner in user credential blockchain 180 is linked to the asset credentials in asset blockchain 170. Responsive to the first user granting temporal authorization to a second user to access, use, own, or possess the asset, the credential information of the second user, including biometric and document credentials in user credential blockchain 180, are included or linked to a transaction granting temporal authorization associated with the asset and owner of the asset in asset blockchain 170.

In some embodiments of the present invention, authorization program 300 includes conditions for granted authorization. The conditions may include one or a combination of: time duration of the authorization, effective distance range in which the authorization is valid, frequency of access or use of the asset, time of day in which the authorization is valid, and an authorized amount of assets that are removed or consumed. In some embodiments, the temporal authorization may be an indefinite or an infinite duration, indicating a transfer of ownership. In some embodiments, use of an asset may be limited by the time of day, such as use of a vehicle during daylight hours, but not at night. In some embodiments, the authorization for use of a financial account or credit card may include limitation on an amount used within a period of time as a condition of the temporal authorization.

Figure 2:
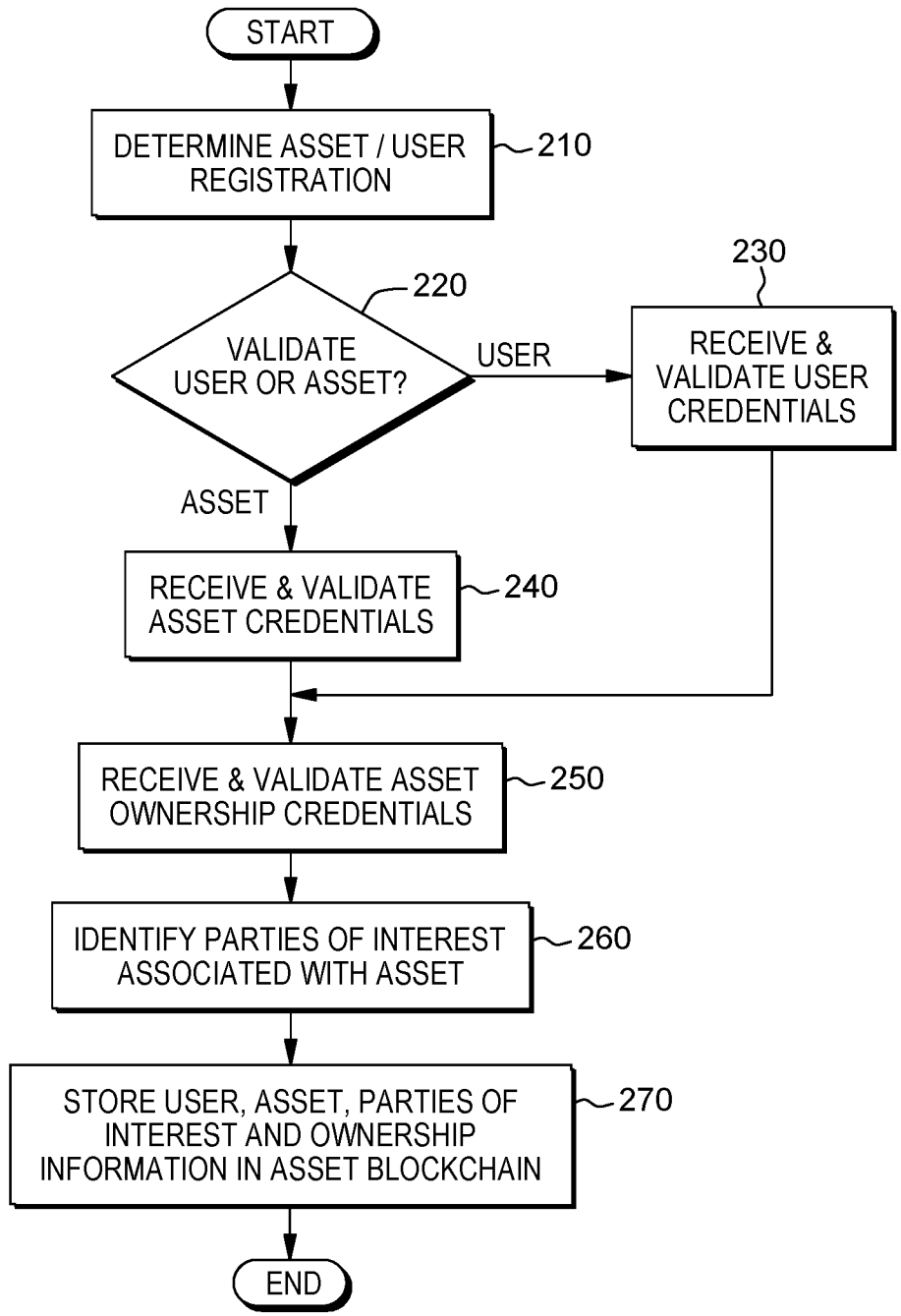
FIG. 2 illustrates operational steps of a registration program, inserted on a computing device within the distributed data processing environment of FIG. 1, in accordance with an embodiment of the present invention.

FIG. 2 illustrates operational steps of registration program 200, operating on computing device 110 within distributed data processing environment 100 of FIG. 1, in accordance with an embodiment of the present invention.

Registration program 200 identifies whether registration is for a user or an asset (step 210). Registration program 200 determines whether the registration is for validation of an asset or a user. In some embodiments of the present invention, the registration includes input indicating whether the credential information is for an asset or a user. In some embodiments the input is manually indicated by a user performing or initiating registration operations. The user manually indicates whether an asset or user is being registered. In other embodiments, an image received from a camera device is used to determine registration, based on object recognition technology. In yet other embodiments, credential information is transmitted to registration program 200, which analyzes the information and automatically determines whether registration is for an asset or user.

For example, registration program 200 receives input of a photograph of a smart phone and a receipt for the purchase of the smart phone that includes the serial number of the smart phone and a credit card number used to purchase the smart phone. Registration program 200 determines that the received photo indicates an asset to be registered. In various embodiments of the present invention, an asset includes but is not limited to, one or a combination of: entry access to a building, room or container; use of a vehicle, smart phone or IoT device; credit card or financial account; membership; or temporal possession of a pet.

Having identified whether registration is for a user or an asset, registration program 200 determines whether validation is for a user or an asset (decision step 220). For the case in which registration program 200 determines that validation is for a user identity (step 220, USER branch), registration program 200 proceeds to step 230 to receive and validate user credentials. For the case in which registration program 200 determines that validation is for an asset, (step 220, ASSET branch), registration program 200 proceeds to step 240 and receives and validates asset credentials. Registration program receives credentials of the asset, which may include but are not limited to: a receipt identifying the asset by serial number, model/type information, or description; a photograph of the asset, a title of the asset, or other documentation. The asset credential information includes data identifying the asset and data identifying the owner of the asset, such as a combination of, but not limited to: name, address, account number, and payment information associated with how the asset was acquired.

For example, for the case in which registration program receives information associated with an asset in which the asset is a car owned by the first user and authorization to use is granted to a second user for a temporary period. Registration program 200 receives information including the car purchase receipt, the car registration, the car title, and contact information associated with parties of interest (discussed in more detail below) that may include the insurance company providing insurance coverage of the car, for any update to policy coverage, and may include a notification for local law enforcement awareness as a notification.

Returning to decision step 220, for the case in which registration program 200 validates a user identity (step 220, USER branch), registration program 200 receives user credentials and confirms the identity of the user based on corroboration of the received credential information. The identity credentials of the user may include documents and photographs, such as a passport, driver license, and birth certificate. The documents may be further corroborated by bills or receipts bearing the name, address, and an account number of the user, and may be further validated by biometric data of the user. In some embodiments of the present invention, registration program 200 receives the credential information from credential sources, such as uploading input 130 and biometric input 120, which may provide real-time transmission of scanned data, or may be accessed by registration program 200 as stored credential data previously submitted by the user. In other embodiments, the user provides the credential information by scanning documents and providing biometric data directly to registration program 200 operating on computing device 110 via network 150.

For example, registration program 200 receives a photograph of the first user, passport documents, residence documents, loan payment documents associated with the asset, and facial recognition biometric data, confirming the identity of the first user.

Registration program 200 receives and validates asset ownership credentials (step 250). Registration program 200 receives credential information identifying a first user as an owner of the asset and analyzes the first user credential information, received from step 230, and compares the first user credential information with the asset credential information received from step 240. In some embodiments of the present invention, the asset credential information received by registration program 200 includes corroborating information with credentials of the first user, such as name, address, account number, or other information found on both asset and user credential information. In addition, biometric data of the first user provides a high level of identification validation. In some embodiments, the asset documents indicate a particular user as the owner of the asset. For example, a receipt for the purchase of an asset may include the name, address and partial credit card number of the purchaser as asset credentials that are uploaded to registration program 200 from uploading input 130 via network 150.

For example, registration program 200 receives asset credential information (step 240) for the asset and receives user credential information (step 230) for the first user. Registration program 200 analyzes the credential information and determines whether the asset credentials indicate ownership by the identified owning user, which is further validated in matching the user credential information. In some embodiments, overlapping and corroborating information from both asset and user credentials supports ownership by the identified user. In the exemplary embodiment, the asset credential information includes photo images of the asset, payment receipts of the purchase of the asset that include the name, address, and account number of the user owning the asset. The asset credential information may also include title documents, certificate of ownership, or other documents identifying the asset. The asset information and owning user information include common information, such as name, address, account numbers, loan payment and balance information, among other information.

In step 260 registration program 200 identifies parties of interest associated with the asset. In some embodiments, there are parties of interest associated with the temporal authorization of the asset to another user. The parties of interest may have a financial interest in the asset, such as a bank holding a loan on the asset, or an insurance company insuring the asset. In other embodiments, parties of interest may include law enforcement, school administration, or other individuals or organizations that may benefit from awareness of the temporal authorization of the asset for access, use, or possession by a second user. In some embodiments, the credential information of the asset includes the identification of parties of interest associated with the asset, and whether the parties of interest have an approval role in temporal authorization of the asset, or a role to receive notification of the authorization details.

For example, a first user grants authorization to their daughter as a second user, to use and possess a smart phone for a week, until the daughter's smart phone, which was forgotten on a vacation trip, can be returned. The first user includes family members, some work associates, and their daughter's closest friends on a list of parties of interest, to make them aware of the temporary use of the first user's phone by the second user (daughter). The credential information of the parties of interest are included in user credential blockchain 180. In some embodiments, the credential information of parties of interest is limited to include one or more points of contact, such as a text message notification, or an email notification.

In step 270 registration program 200 stores user, asset, parties of interest, and ownership information in asset blockchain 170. The credential information of the first user, the second user, the asset and parties of interest are linked by the transaction of assigning a temporal authorization of the asset to the second user, by the first user, and the information and connections are stored in a transaction repository ledger-like structure, such as a blockchain structure. The stored credential information and transaction acknowledges the authorization of the second user to access, use, or possess the asset, subject to the conditions of the authorization. The authorization and supporting credentials are read-only accessible to the first user, the second user, and the parties of interest associated with the asset. In some embodiments, more than one user may receive temporal authorization for the asset simultaneously. In some embodiments, the temporal authorization may support a permanent transfer of ownership of the asset to the second user. In yet other embodiments, the temporal authorization may include conditions that limit the authorization associated with the asset.

For example, the first user, validated as the owner of a vehicle as an asset, grants authorization to a second user, validated by documents and biometric data (e.g., finger print recognition). The first user includes in the authorization transaction, the insurance company insuring the vehicle with notification to adjust insurance coverage to include the second user under the policy, and the bank that holds the loan on the vehicle, for awareness and to confirm insurance coverage of the second user operating the vehicle. The credential information of the first user, the second user, and parties of interest received from user credential blockchain 180, and the asset credential information from asset blockchain 170, are linked to the transaction authorizing the use of the vehicle by the second user for a temporary period of time, and included in a blockchain ledger, such as asset blockchain 170. Once the transaction is approved by all approving parties (first user in this example) the transaction is complete and stored in the asset blockchain.

Figure 3:
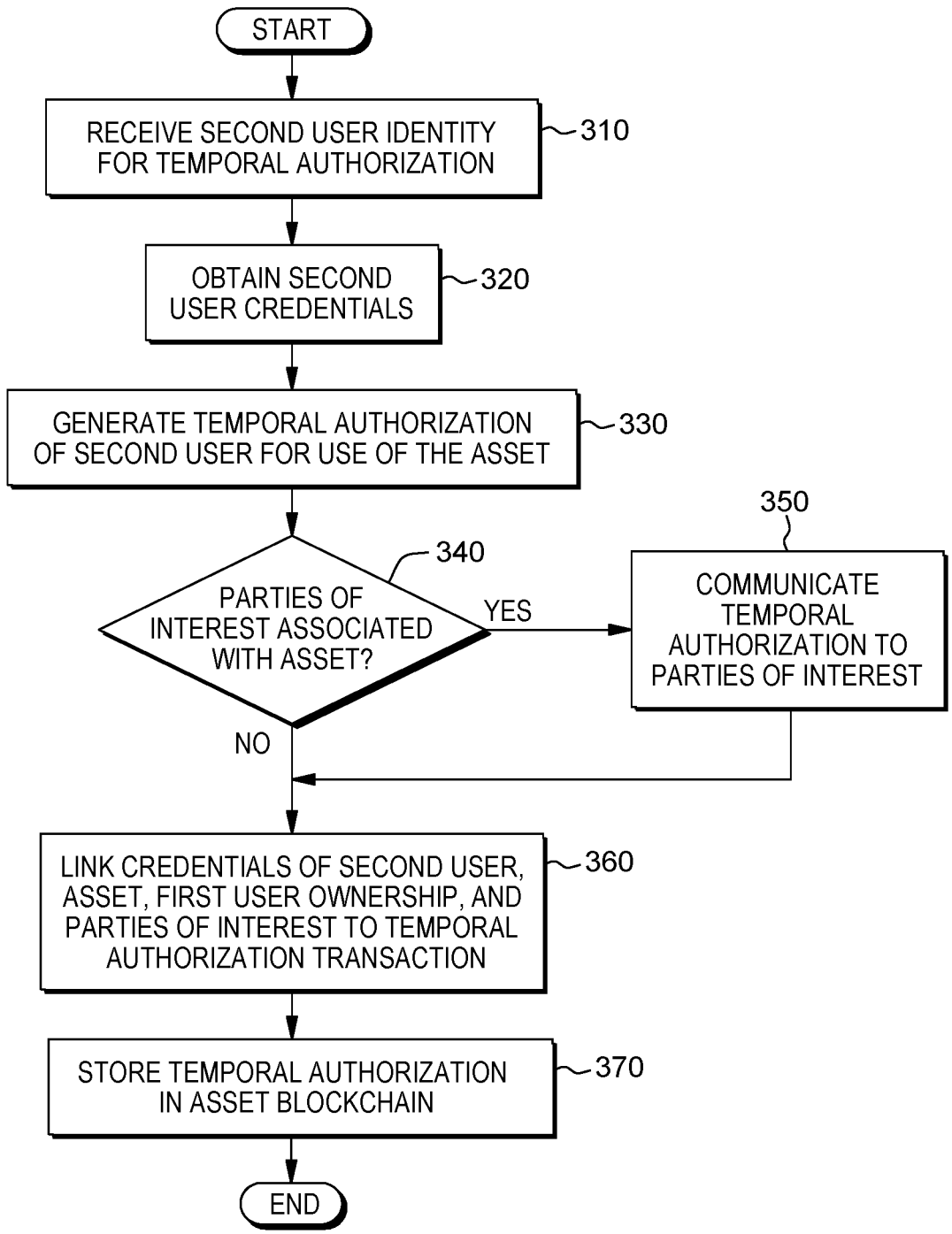
FIG. 3 illustrates operational steps of an authorization program, inserted on a computing device within the distributed data processing environment of FIG. 1, in accordance with an embodiment of the present invention.

FIG. 3 illustrates operational steps of authorization program 300, operating on computing device 110 within distributed data processing environment 100 of FIG. 1, in accordance with an embodiment of the present invention.

Authorization program 300 receives second user identity for temporal authorization of an asset (step 310). In some embodiments of the present invention, authorization program 300 receives from a first user as an owner of an asset, the identification of a second user and confirmation by the first user to grant authorization for temporal access, use, or possession of an asset owned by the first user. In some embodiments of the present invention, the asset is identified, and the ownership of the asset is validated resulting from registration program 200 results, and stored in a transactional repository structure, preferably a ledger structure, such as a Blockchain structure as depicted by asset blockchain 170.

Authorization program 300 obtains second user credential information (step 320). Authorization program 300 accesses credential information stored by registration program 200 and receives the credential information validating the second user's identity. For example, authorization program 300 accesses user credential blockchain 180 and obtains credential information for the second user that includes information from passport, license, billing invoices, mortgage payment receipts, and biometric data that includes facial recognition and finger print data of the second user.

Having received confirmation from the first user and obtaining credential information of the second user, authorization program 300 generates a temporal authorization for the second user to use the asset (step 330). The temporal authorization grants one or a combination of access, use, ownership, and possession of the asset by the second user. In some embodiments of the present invention, the asset authorization is enabled by the second user providing identification such as biometric data. In other embodiments, for assets with access protection by passcode, the second user may be supplied a temporary passcode to access the asset, that may include conditions of the temporal authorization, such as duration, frequency, amount, time of day, or other condition. In some embodiments, granting of temporal authorization includes transmitting of a confirming notification to the second user.

For example, the first user confirms the action to grant temporary authorization of a second user to access an apartment located on a beach and owned by the first user. Authorization program 300 receives the second user's identity and accesses the user credential information stored by registration program 300 in user credential blockchain 180. Authorization program 300 obtains the credential information of the second user which includes biometric data of the second user's facial recognition and finger print recognition. Authorization program 300 generates a temporal authorization of the second user to access and use the apartment on the beach which includes a IoT smart lock, activated by facial recognition. Authorization program 300 includes the biometric facial recognition credential data as validation of the second user to access and use the apartment on the beach for the designated period of the temporal authorization.

Having generated the temporal authorization to access, use, own, or possess the asset, authorization program 300 determines whether there are parties of interest associated with the asset (decision step 340). Authorization program 300 accesses the repository of asset credential information for the asset and determines whether there are parties of interest associated with the asset. For the case in which authorization program 300 determines that there are parties of interest associated with the asset, authorization program 300 proceeds to step 350 and generates communications informing the parties of interest of the temporal authorization of the second user regarding the access, use, ownership, or possession of the asset. In some embodiments the communication may be a notification in the form of an email or a text message to a predetermined destination contact point. In other embodiments, the communication may be an automated phone call to a predetermined phone number or phone mail.

In some embodiments, the parties of interest have approval authority to complete the temporal authorization, and communication sent to the parties of interest include an expectation of response that approves or denies the intended temporal authorization (not shown in FIG. 3). Having communicated the temporal authorization, and receipt of additional approvals as appropriate, authorization program 300 proceeds to step 360.

For example, authorization program 300 accesses asset blockchain 170 and searches for the information associated with a particular asset owned by the first user, such as a new car. Authorization program 300 determines that there are parties of interest associated with the car as an asset, including the bank holding the loan for the car and the insurance company providing insurance coverage for the car. Authorization program 300 sends notifications to the bank and insurance companies as parties of interest associated with the new car asset. As part of the loan agreement, the insurance company has approval authority for additional drivers added to the insurance policy and reviews the driving record of the second user to determine whether the temporal authorization to use the car is approved.

For the case in which authorization program 300 determines that no parties of interest are associated with the asset, authorization program 300 proceeds to step 360.

Authorization program 300 links the credentials of second user, asset, first user ownership, and parties of interest to the temporal authorization transaction (step 360). The credentials validating the identity of the second user, the ownership status of the first user and the identification of the asset and the identity and contact information (and possible approval status) of parties of interest are linked to the generated temporal authorization of the second user for one or a combination of access, use, and possession of the asset. The linkage includes trackable and viewable access to the respective credential information from the temporal authorization transaction, as well as view access of the temporal authorization from the user, asset and parties of interest credential records. The linkage also includes view of the details and conditions of the temporal authorization.

Authorization program 300 stores the temporal authorization transaction data in the asset blockchain (step 370). The linked ownership and identity credentials, along with parties of interest information associated with the asset, are stored as a transaction in the asset blockchain structure. In some embodiments of the present invention, the linked ownership, identity, and parties of interest credentials and information are stored in the user credential blockchain. In other embodiments, another transaction ledger-type data structure is used to store the linked credential information associated with the temporal authorization of the second user to access, use, own, or possess the asset.

For example, a temporal authorization is granted to a second user for access to a financial account of a first user owning the account. No parties of interest are involved, and the temporal authorization is granted for a duration of one week, and for use of an amount not to exceed $1,000.00. The identification credentials of the second user and the owning first user from user credential blockchain 180 are linked to the credential information of the asset stored in asset blockchain 170. The linkage enables verification of the identity and roles of the first and second users and the financial account asset block from the temporal authorization transaction block of asset blockchain 170, and view of the temporal authorization transaction information from the financial account asset block of asset blockchain 170, and from the first user and second user credential information blocks of user credential blockchain 180.

A non-limiting set of additional examples of temporal authorization is provided:

A first user owns a car and is the only driver of the car. The car is started by biometric identification, which also lowers the insurance costs. The first user develops a situation that requires a second user to use the car of the first user for three days. The first user provides information to an asset information repository and a user information repository that enables the first user to grant temporary access to the second user to drive the first user's car. The biometric data of the second user is included in the user repository along with additional identification credential information. The first user grants the temporary authorization, which updates the car security system to recognize the biometric data of the second user, allowing the second user to operate the car. The updates also provide notification to the insurance company indicating the additional driver of the car and enabling the insurance company to determine if additional coverage is required.

A first user has a new smart phone that unlocks using the biometric data of facial recognition. The first user forgets to take the phone on a trip and needs to ask a second user about some information residing on the smart phone. The first user provides updates to include facial recognition data of the second user and generates a temporal authorization for the second user to access and use the smart phone as the asset. The second user is enabled to unlock and retrieve the information requested by the first user. The temporal authorization expires subsequent to the duration (and conditions) of the temporal authorization.

A first and second user are engaged in a heated argument and the second user leaves taking the car keys of the first user that owns the car; however, the second user does not have authorization by the first user to use the first user's car. The second user drives away and ends up in an accident. The insurance company of the first user pursues legal responsibility and reimbursement from the second user because there is proof that the second user was not authorized to use the car of the first user.

A first user sells their dog to a second user. The first user updates an asset credential repository with nose print biometric data of their dog, includes or selects user credentials of the second user in a user credential repository, and generates a temporal authorization for the second user to possess the dog for an indefinite duration; effectively transferring ownership of the dog to the second user.

A first user wishes to grant a second user authorization to purchase items on the credit card of the first user, at a designated store, for a designated day. The first user enters or selects user credentials for the second user from the user credential repository and generates a temporal authorization for the use of the credit card as the asset, by the second user for the next 24 hours. The conditions of the temporal authorization limit purchases to a particular store, and to an amount not to exceed $300. The credit card company is sent a notification of the temporal authorization and is included as a party of interest in purchase approvals made during the temporal authorization.

Figure 4:
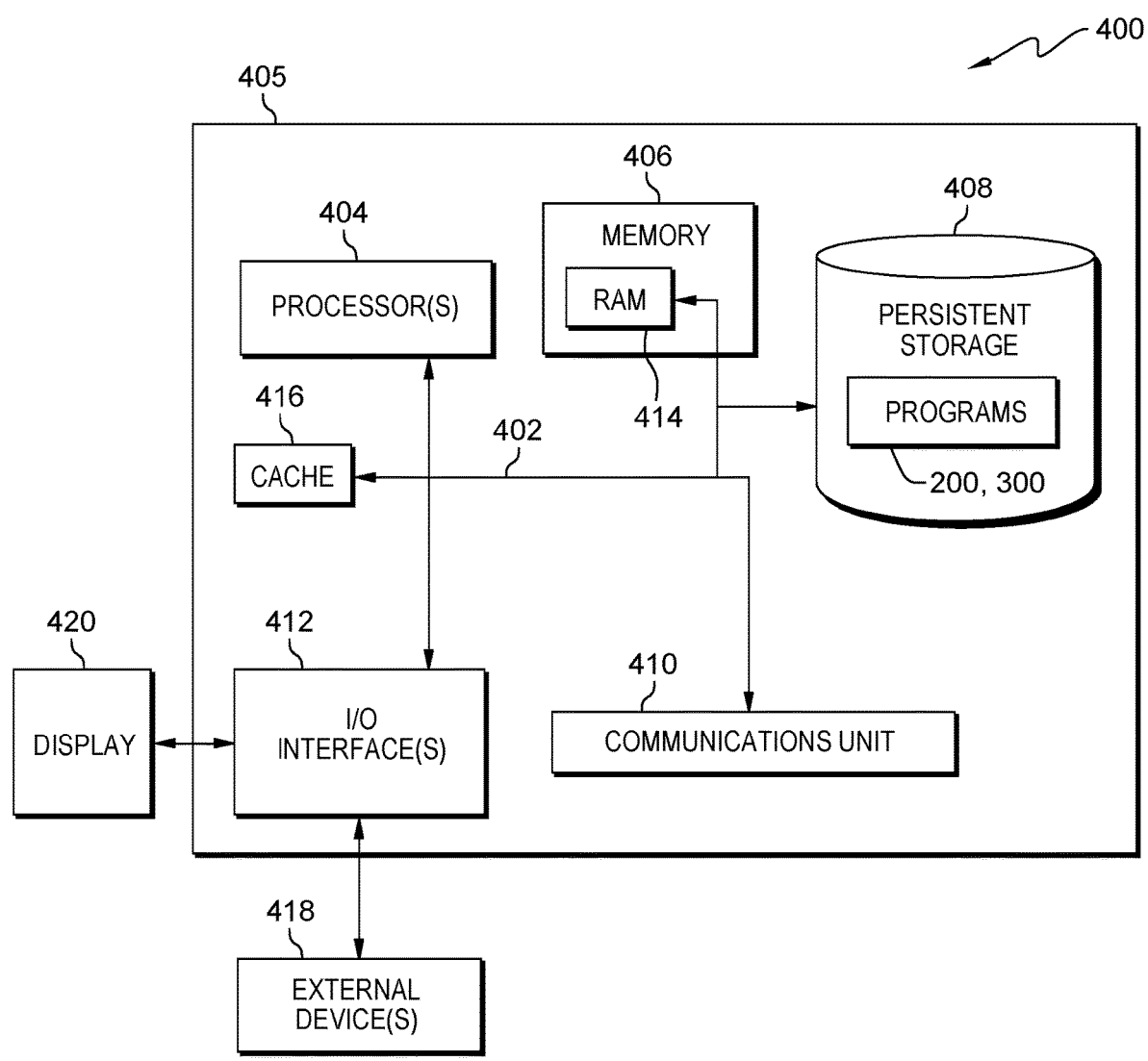
FIG. 4 depicts a block diagram of components of a computing system, including a computing device capable of operationally performing the registration and authorization programs of FIGS. 2 and 3 respectively, in accordance with an embodiment of the present invention.

FIG. 4 depicts a block diagram of components of computing system 400, which includes computing device 405. Computing device 405 includes components and functional capability similar to computing device 110 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

Registration program 200 and authorization program 300 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Registration program 200 and authorization program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., registration program 200 and authorization program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
validating, by one or more processors, information indicating ownership of an asset by a first user, by accessing the information from a first shared blockchain structure;

receiving, by the one or more processors, information of parties of interest regarding a use of the asset;

storing, by the one or more processors, in the first shared blockchain structure, asset information, ownership information of the asset, and the information of the parties of interest regarding the use of the asset;

validating, by the one or more processors, identification credentials of a second user, selected by the first user to receive a temporal authorization of the use of the asset, by accessing the identification credentials from a second shared blockchain structure;

in response to confirming the validation of the identification credentials of the second user, generating, by the one or more processors, a transaction that provides the temporal authorization of the use of the asset by the second user, wherein the transaction of the temporal authorization includes viewable linkage between the first shared blockchain structure and the second shared blockchain structure including linkage to conditions limiting the temporal authorization;

in response to a generation of the transaction that provides the temporal authorization of the use of the asset by the second user, sending, by the one or more processors, a notification of the temporal authorization for the use of the asset by the second user to the parties of interest regarding the use of the asset; and storing, by the one or more processors, information associated with the transaction of the temporal authorization of the use of the asset by the second user in the first shared blockchain structure.

2. The method of claim 1, wherein the identification credentials of a second user include biometric data.

3. The method of claim 1, wherein generating the temporal authorization of the use of the asset by the second user includes informing the parties of interest regarding the use of the asset by an electronic communication.

4. The method of claim 1, wherein the temporal authorization includes an indefinite level of usage.

5. The method of claim 1, wherein the use of the asset includes one or a combination selected from a group consisting of: access, use, ownership, and possession of the asset.

6. The method of claim 1, wherein the temporal authorization is based on a range of a time of day.

7. The method of claim 1, further comprising:
receiving, by the one or more processors, identification credential information of a plurality of users, wherein the plurality of users includes the first user and the second user, and the identification credential information includes respective fingerprint biometric data of the plurality of users; and
storing, by the one or more processors, in the second shared blockchain structure, the identification credential information of the plurality of users including the respective fingerprint biometric data of the plurality of users.

8. The method of claim 1, wherein the generation of the transaction providing the temporal authorization of the user of the asset by the second user is based on receipt of approval from one or more of the parties of interest regarding the use of the asset.

9. A computer program product comprising:
one or more computer readable storage media and program instructions stored on the one or more computer readable storage media, the program instructions comprising:

program instructions to validate information indicating ownership of an asset by a first user, by accessing the information from a first shared blockchain structure;
program instructions to receive information of parties of interest regarding a use of the asset;
program instructions to store in the first shared blockchain structure, asset information, ownership information of the asset, and the information of the parties of interest regarding the use of the asset;
program instructions to validate identification credentials of a second user, selected by the first user to receive a temporal authorization of the use of the asset, by accessing the identification credentials from a second shared blockchain structure;
in response to confirming the validation of the identification credentials of the second user, program instructions to generate a transaction that provides the temporal authorization of the use of the asset by the second user, wherein the transaction of the temporal authorization includes viewable linkage between the first shared blockchain structure and the second shared blockchain structure including linkage to conditions limiting the temporal authorization;
in response to a generation of the transaction that provides the temporal authorization of the use of the asset by the second user, program instructions to send a notification of the temporal authorization of the use of the asset by the second user to the parties of interest regarding the use of the asset; and
program instructions to store information associated with the transaction of the temporal authorization of the use of the asset by the second user in the first shared blockchain structure.

10. The computer program product of claim 9, wherein the identification credentials of a second user include biometric data.

11. The computer program product of claim 9, wherein program instructions to generate the transaction of the temporal authorization of the use of the asset by the second user includes approval by one or more of the parties of interest.

12. The computer program product of claim 9, further comprising:
program instructions to receive identification credential information of a plurality of users, wherein the plurality of users includes the first user and the second user, and the identification credential information includes respective biometric data of the plurality of users; and
program instructions to store in the second shared blockchain structure, the identification credential information of the plurality of users including respective biometric data of the plurality of users.

13. A computer system comprising:
one or more computer processors;
one or more computer readable storage media; and
program instructions stored on the one or more computer readable storage media, the program instructions comprising:
program instructions to validate information indicating ownership of an asset by a first user, by accessing the information from a first shared blockchain structure;
program instructions to receive information of parties of interest regarding a use of the asset;
program instructions to store in the first shared blockchain structure, asset information, ownership information of the asset, and the information of the parties of interest regarding the use of the asset;

program instructions to validate identification credentials of a second user, selected by the first user to receive a temporal authorization of the use of the asset, by accessing the identification credentials from a second shared blockchain structure;

in response to confirming the validation of the identification credentials of the second user, program instructions to generate a transaction that provides the temporal authorization of the use of the asset by the second user, wherein the temporal authorization includes conditions limiting the temporal authorization, and wherein the transaction of the temporal authorization includes viewable linkage between the first shared blockchain structure and the second shared blockchain structure including linkage to conditions limiting the temporal authorization;

in response to a generation of the transaction that provides the temporal authorization of the use of the asset by the second user, program instructions to send a notification of the temporal authorization of the use of the asset by the second user to the parties of interest regarding the use of the asset; and program instructions to store information associated with the transaction of the temporal authorization of the use of the asset by the second user in the first shared blockchain structure.

14. The computer system of claim 13, wherein the identification credentials of a second user include biometric data.

15. The computer system of claim 13, wherein program instructions to generate the temporal authorization of the use of the asset by the second user includes approval by one or more of the parties of interest.

16. The computer system of claim 13, wherein the temporal authorization includes an indefinite duration.

17. The computer system of claim 13, wherein the use of the asset by the second user includes one or a combination selected from a group consisting of: access, use, ownership, and possession of the asset.

* * * * *